United States Patent [19]

Wagener et al.

[11] 3,998,776

[45] Dec. 21, 1976

[54] ISOTHIOURONIUM STABILIZED LATEXES

[75] Inventors: Earl H. Wagener, Concord, Calif.; Ritchie A. Wessling; Dale S. Gibbs, both of Midland, Mich.

[73] Assignee: The Dow Chemical Company, Midland, Mich.

[22] Filed: Apr. 10, 1975

[21] Appl. No.: 566,865

Related U.S. Application Data

[63] Continuation-in-part of Ser. No. 392,700, Aug. 29, 1973, Pat. No. 3,882,009.

[52] U.S. Cl. .............. 260/20.6 SQ; 260/29.6 HN; 260/29.6 Z; 260/29.6 MQ; 260/29.6 MN; 260/29.7 H; 260/29.7 SQ; 260/29.7 N; 260/29.7 EM
[51] Int. Cl.$^2$ ........................................ C08L 31/00
[58] Field of Search ............... 260/564 E, 29.6 SQ, 260/29.6 HN, 29.6 Z, 29.6 MQ, 29.6 MN, 29.7 H, 29.7 SQ, 29.7 N, 29.7 EM

[56] References Cited

UNITED STATES PATENTS

| | | | |
|---|---|---|---|
| 3,123,636 | 3/1964 | Loev et al. | 260/552 |
| 3,179,638 | 4/1965 | Shashous | 260/564 E |
| 3,544,532 | 12/1970 | Jones et al. | 260/29.7 H |
| 3,594,355 | 7/1971 | Vandenberg et al. | 260/79 |
| 3,637,432 | 1/1972 | Gibbs et al. | 260/29.6 TA |
| 3,642,879 | 2/1972 | Sheetz et al. | 260/501.14 |
| 3,873,488 | 3/1975 | Gibbs et al. | 260/29.7 H |

*Primary Examiner*—M. J. Welsh
*Attorney, Agent, or Firm*—I. A. Murphy

[57] ABSTRACT

An aqueous dispersion containing a water-insoluble, essentially electrically non-conductive, organic polymer as cation-active particles wherein a substantial portion of the cation-activity is provided by isothiouronium cations may be obtained by various methods including emulsion polymerization of hydrophobic monomers using an isothiouronium surfactant or by emulsion copolymerization of a monomer containing isothiouronium groups with hydrophobic monomers.

11 Claims, No Drawings

ISOTHIOURONIUM STABILIZED LATEXES

CROSS-REFERENCES TO RELATED APPLICATIONS

This application is a continuation-in-part of application Ser. No. 392,700, filed August 29, 1973, now U.S. Pat. No. 3,882,009.

BACKGROUND OF THE INVENTION

1. Field of the Invention

The invention is concerned with polymers in aqueous colloidal dispersion, i.e., latexes, which are stabilized by isothiouronium cations.

2. Description of the Prior Art

U.S. Pat. No. 3,123,636 describes thiuronium halides which are viscous oils that are soluble in water and are useful as insect attractants and bactericides. The patent states that the compounds when shaken in water cause foaming, thus illustrating surfactant properties.

U.S. Pat. No. 3,594,355 describes water-soluble isothiuronium salts of epihalohydrin polymers and copolymers. These water soluble salts are disclosed as highly useful as shrinkproofing agents for wool, as wet and dry strength paper additives, as flocculating agents, as cross-linkable coatings for textiles and as semipermeable membranes. There is no suggestion that any kind of latex can be prepared with the polymers.

U.S. Pat. No. 3,642,879 describes S-(vinylbenzyl)isothiouronium compounds in which the isothiouronium moiety has the formula

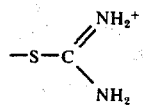

These compounds are useful as pesticides for the control of various plant, insects, and fungal pests and are monomers which can be polymerized. A latex of a copolymer of one of these compounds with styrene and butadiene is described. Such latexes, however, are useful and stable only in acidic media over a narrow pH range.

Summary of the Invention

In accordance with the present invention, there are provided aqueous colloidal dispersions of cation-active particles; the polymer comprising the dispersed particles being a water-insoluble, essentially electrically non-conductive organic polymer wherein a substantial portion, especially one-half or more, of the cation-activity is provided by isothiouronium cations having nitrogen atoms with covalent bonds only to carbon atoms. The aqueous colloidal dispersions, i.e., latexes, have a pH from about 2 to about 12, preferably from about 6 to about 10 and a particle size of from about 500 Angstroms to about 10,000 Angstroms, preferably from about 800 Angstroms to about 5,000 Angstroms.

DESCRIPTION OF THE PREFERRED EMBODIMENTS

The present invention is concerned with aqueous dispersions of water-insoluble, essentially electrically non-conductive, organic polymers.

It is required for the present invention that a polymeric component must be in the form of an aqueous dispersion of cation-active particles in which a substantial portion, especially one-half or greater, of the cation activity is provided by isothiouronium cations. Such cations may be attached to the polymer particles in various ways. For illustration, a surfactant comprising an isothiouronium cation may be used in the preparation of the polymers by emulsion polymerization whereby the surfactant is adsorbed on the polymer particle. Alternatively, a latex can be prepared by emulsion polymerization using other emulsifiers then replacing at least a major proportion of the polymerization emulsifier in such latexes by removal of that emulsifier such as by dialysis or ion exchange methods and then substituting therefor an isothiouronium surfactant. In still another procedure, preformed polymers, obtained for example by mass polymerization, are converted to aqueous dispersions with the aid of the same kind of surfactant such as by dissolving the polymer in a solvent, then thoroughly mixing the solution with water and the surfactant and subsequently removing the solvent to obtain a latex composition. Yet another procedure is to prepare a water-in-oil dispersion by adding a surfactant comprising an isothiouronium cation to a preformed polymer, then slowly adding water to the water-in-oil dispersion with thorough mixing until inversion occurs to form an oil-in-water dispersion. The isothiouronium cation also may become a part of the polymer, for example, by the copolymerizaton with the other monomeric constituents of the polymer, of a monomer containing an isothiouronium cation such as S-vinylbenzyl-N,N,N',N'-tetramethylisothiouronium chloride.

Ethylenically unsaturated monomers which are polymerized by an emulsion polymerization process are represented by, but not restricted to, non-ionic monomers such as the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene fluoride. Specific examples of such ethylenically unsaturated compounds are styrene, α-methylstyrene, ar-methylstyrene, ar-ethylstyrene, α-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl α-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene.

Such non-ionic monomers form water-insoluble homopolymers or water-insoluble copolymers when more than one of the group is used. However, there may be used as copolymerized constituents with the above kinds of monomers other monomers which as homopolymers would by water-soluble. The hydrophilic, water-soluble monomers are represented by hydroxyethyl acrylate, hydroxyethyl methacrylate, acrylamide, methacrylamide, N-methylol acrylamide, N-methylol methacrylamide and other modified acrylamides such as diacetone acrylamide, and diacetone methacrylamide.

Such monomers are not used in sufficiently large proportions as to make the copolymer water-soluble or significantly electrically conductive. The proportion of such somewhat hydrophilic, water-soluble, monomers which may be copolymerized constituents of the polymers operable in the practice of this invention ordinarily ranges from 0 to about 30 percent based on the total weight of the copolymer.

In the specification, by the term "essentially hydrophobic, emmulsion polymerizable, ethylenically unsaturated monomer composition" is meant a monomer or mixture of monomers according to the foregoing description.

In one embodiment, the aqueous dispersions of this invention are conveniently prepared from the above-described monomers by emulsion polymerization using free-radical producing catalysts usually in an amount from about 0.01 percent to about 3 percent based on the weight of the monomers and an isothiouronium surfactant, as herein defined, under conventional conditions of agitation, time, pressure, and temperature, using either a batchwise, incremetal or continuous type addition of the monomers, water and other constituents to a reaction vessel or to a series of such vessels, or by polymerization in a coil reactor. In another embodiment, isothiouronium monomers, as herein described, are copolymerized with the above-described monomers in the same manner except that the isothiouronium surfactant is reduced in amount or omitted. In either embodiment, conventional additives for latex compositions may be included in small but usual amounts and in a known manner. Such materials include, but are not restricted to, chain transfer agents, short stopping agents, buffers, anti-foaming agents, chelating agents, inorganic salts, plasticizers, tinting materials, bactericides, or other preservatives, and the like. Small amounts of non-ionic or other cationic surfactants may also be empolyed, particularly when using the lower amount of the monomeric isothiouronium salts. Sometimes the isothiouronium surfactant or other surfactants are introduced into the polymerization mixtures as a component of a preformed seed latex. In one process, to small amounts of a seed latex are added water, the polymerizable isothiouronium salts, the other constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system and the decomposition temperature of the isothiouronium salt being used, such temperatures usually being between about 0° C. and about 100° C., preferably below about 90° C. It is often advantageous to keep the rate of monomer addition low enough so that the monomer addition rate controls the rate of polymerization.

The catalysts are of the type which produce free-radicals and conveniently are per-oxygen compounds for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, aluroyl peroxide, peracetic acid and perbenzoic acid — sometimes activiated by water-soluble reducing agents such as a ferrous compound, sodium bisulfite or hydroxylamine hydrochloride — and other free-radical producing materials such as 2,2'-azobisisobutyronitrile.

The polymeric constituent in the present products may be polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereo-specific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which are suitable for the present invenion are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

Methods for preparing the above described polymers are well known and are not a part of this invention. The polymers are converted to aqueous dispersions by methods already summarized above.

The aqueous dispersions, i.e., the latex compositions, regardless of their method of preparation, usually are prepared at a polymer solids content from about 35 percent to about 60 percent, preferably from about 40 percent to about 50 percent. When the dispersions are intended for some uses such as in an electrodeposition process, they may be diluted with water to give a desired lower solids content before use such as from about 2 percent to about 35 percent.

The aqueous dispersion may be used over a wide range of pH such as from 2 to about 12. Because of corrosion problems below a pH of 6, however, operation above a pH of 6 is preferred. Although operable in processes above a pH of 10, isothiouronium compounds decompose with time at such pH values. Therefore, a pH range of from about 6 to about 10 is especially preferred. If the latexes are to be stored for lengthy periods, during those periods the pH should be kept between 6 and 8.

Isothiouronium surfactants, in common with other surfactants or emulsifiers, have a hydrophobic component and a hydrophilic component. The hydrophilic portion of an isothiouronium surfactant is provided by the isothiouronium group, i.e., represented by the formula

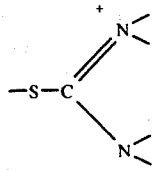

or one of its resonance forms. In order that the charge will be independent of pH, none of the disconnected valences on the nitrogen shown in the above formula should be attached to hydrogen. Thus, the N-tetrasubstituted isothiouronium compounds are preferred. The identity of the hydrophobic portion is not critical. The present invention is concerned with aqueous dispersions of polymers which are maintained in dispersion primarily with isothiouronium cations. The isothiouronium surfactants or emulsifiers are represented by water-soluble salts having the formula

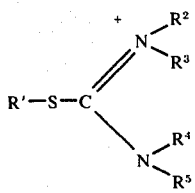

wherein R' is a long chain, monovalent hydrophobic radical having from 8 to 25 carbon atoms, $R^2$ and $R^5$ individually are alkyl or hydroxyalkyl having from 1 to 4 carbon atoms, $R^3$ and $R^4$ individually are alkyl or hydroxyalkyl having from 1 to 4 carbon atoms or are combind in one divalent radical having from 2 to 3 carbon atoms, and $Z^-$ is a water-soluble counteranion. R' may be a hydrocarbon radical or a primarily hydrocarbon chain whose chain-length may be interrupted by oxygen, sulfur, nitrogen, phosphorous, or a keto, ester or amide linkage or a terminal group — such as hydroxy, keto, ester or amide — may be present. The hydrophobic radicals are not restricted to linear chains and may include aromatic components such as aralkyl.

The copolymerizable monomers which may be used to supply the isothiouronium groups on the polymer have the same formula as that for the surfactants given above except that R' is a monovalent organic radical, e.g., aliphatic aromatic or alicyclic, having polymerizable ethylenic unsaturation. When such monomers are used, the proportion is less than that which would be required to cause the resulting copolymer to be water-soluble or electrically-conductive when in the dry state.

In materials for use in the practice of the present invention, the counterion $Z^-$ is an anion and is not necessarily water-soluble over the entire pH range, but should be water-soluble over the pH range which is acceptable in a particular process or use contemplated for the product. The counteranion, $Z^-$, is an anion which does not coagulate the dispersion and typically is the anion of an inorganic acid such as chloride, bromide, fluoride, nitrate, sulfate, bicarbonate, and phosphate; or an anion of an organic acid such as acetate, maleate, citrate, propionate, fumarate, acrylate, and benzolate, or hydroxide.

The isothiouronium compounds may be obtained by a modification of the method disclosed in U.S. Pat. No. 3,721,581 by reacting a compound R'X with a N-tetrasubstituted thiourea of the formula

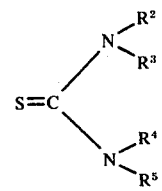

in which formulas R', $R^2$, $R^3$, $R^4$ and $R^5$ are as described supra and X is a halogen. Particularly, R' is as identified above, rather than as identified in the cited patent.

Representative compounds of the formula R'X are alkyl chlorides having from 8 to 25 carbon atoms such as n-octyl chloride, 2-ethylhexyl chloride, n-dodecyl choride, tetradecyl chloride, cetyl chloride, eicosyl chloride, docosyl chloride and tetracosyl chloride; alkylbenzyl chlorides in which the alkyl has from 4 to 18 carbon atoms such as n-butylbenzyl chloride, n-amylbenzyl chloride, n-hexylbenzyl chloride, isohexylbenzyl chloride, n-octylbenzyl chloride, dodecylbenzyl chloride, tetradecylbenzyl chloride, and octodecylbenzyl chloride; alkylphenethyl chlorides such as butylphenethyl chloride, hexylphenethyl chloride, octylphenethyl chloride, dodecylphenethyl chloride, tetradecylphenethyl chloride, and hexadecylphenethyl chloride; and the dialkyl α-chlorosuccinates such as diamyl α-chlorosuccinate, dihexyl α-chlorosuccinate, diheptyl α-chlorosuccinate, dioctyl α-chlorosuccinate, dinonyl α-chlorosuccinate, didecyl α-chlorosuccinate and didodecyl α-chlorosuccinate. Representative compounds of the formula R'X which may be used to prepare copolymerizable monomers containing isothiouronium groups are vinylbenzyl chloride, allyl chloride, bromoalkyl acrylates, bromoalkyl methacrylates, and 2-methylene-3-butenyl chloride. The corresponding bromides and iodides may be used instead of the chlorides.

The N-tetrasubstituted thioureas are represented by tetramethylthiourea, tetraethylthiourea, N,N,N',N'-tetrahydroxyethylthiourea, N,N,N',N'-tetrahydroxypropylthiourea, N,N,N',N'-tetrahydroxybutylthiourea, N,N'-ethylene-N,N'-dihydroxyethylthiourea, N,N'-dimethyl-N,N'-dibutylthiourea, N,N'-dimethyl-N,N'-diethylthiourea and N,N'-diethyl-N,N'-dipropylthiourea.

The particle size (average diameter) of the aqueous dispersion or latex, however obtained, usually is in the range of from about 500 Angstroms to about 10,000 Angstroms, preferably from about 800 Angstroms to about 5,000 Angstroms.

The polymer particles have hydrophobic properties because of the nature of the polymer but have some hydrophilic character through positive charges, and hence some cationic character, because of the presence on the particle surface of isothiouronium groups such as from adsorbed emulsifiers or from copolymerized monomers having isothiouronium groups wherein the amount of such groups attached to the polymer is sufficient to provide water-dispersibility but is insufficient to impart water-solubility or electrical conductivity to the dry, organic polymer. Thus, isothiouronium groups are present on the polymer because of adsorbed surfactants containing the groups, or because of copolymerization of monomers containing such groups, or because of conversion of other substituent groups on the polymer to isothiouronium groups. The isothiouronium group, i.e., cation, has the formula

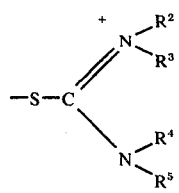

and the counterion is Z⁻ wherein $R^2$, $R^3$, $R^4$, $R^5$ and $Z^-$ are as defined above for the isothiouronium surfactants. The total quantity of cation-active groups usually ranges from about 0.02 milliequivalent to about 0.4 milliequivalent per gram of polymer.

In this specification and the accompanying claims the term "cation-active particles" as applied to the polymer particles refers to particles according to the foregoing description.

The products of this invention may be used in a deposition process to coat electroconductive surfaces, i.e., articles having an electroconductive surface.

Electrodeposition processes in which the products of this invention may be used are described in our copending application, Ser. No. 392,700, filed Aug. 29, 1973, now U.S. Pat. No. 3,882,009 especially from page 13, line 11, through page 22.

The following examples show ways in which the present invention can be practiced, but should not be construed as limiting the invention. All parts are parts by weight and all percentages are weight percentges, unless otherwise expressly indicated.

EXAMPLE I

A thermoplastic acrylic latex is prepared in the following manner. A monomer mixture is prepared from 960 grams of butyl acrylate and 640 grams of styrene and to this mixture is added 10 grams of an 82.7 percent solution of t-butylhydroperoxide to form a monomer feed solution. A seed latex is prepared from 750 grams of a surfactant solution previously prepared by stirring 745 grams of water and 5 grams of dodecylbenzyl-N,N,N',N'-tetramethylisothiouronium chloride for 2 hours under a stream of nitrogen to which is then added 25 grams of the monomer feed solution, followed by a continuously-added reducing stream pumped for about 2 hours at a rate of 7.67 grams per hour, the stream being a portion of a solution previously prepared from 9 grams of hydroxylamine hydrochloride diluted to 500 grams with deionized water. To the seed latex is added monomer feed solution at a rate of 55 grams per hour with continuation of a reducing stream of the same rate of addition and composition as in the seed latex and concurrently pumping into the reaction mixture at the rate of 20 grams per hour a surfactant solution previously prepared from 475 grams of deionized water and 25 grams of S-p-dodecylbenzyl-N,N,N',N'-tetramethylisothiouronium chloride. After 20 hours the monomer feed is stopped, 0.5 gram of tert-butylhydroperoxide is added and the reaction is continued for an additional 2 hours. The product is a clean, fluid latex having a solids content of 41.1 percent and a particle size of 1170 Angstroms.

EXAMPLE 2

Preparation of Surfactant Solution A

A mixture of 67.1 grams (0.22 mole) of hexadecyl bromide and 26.4 grams (0.20 mole) of tetramethylthiourea is diluted with ethanol to a total weight of 200 grams, which is then stirred at 85° C for 8 hours. The resulting crude product is filtered and extracted with hexane, then added to 300 parts of water. The resulting mixture is vacuum stripped at 35° C. The product is an aqueous solution of 0.73 milliequivalent of hexadecyltetramethylisothiouronium bromide per gram of solution (a 31.9 percent active solution, by weight).

Preparation of Monomeric Isothiouronium Salt (Comonomer Emulsifier) — Solution B A mixture is prepared of 66 grams (0.5 mole) of tetramethylthiourea, 84 grams (0.55 mole) of vinylbenzyl chloride and 350 grams of methanol. The mixture is filtered and 480 grams of the filtrate is introduced into a flask and maintained at 70° C under nitrogen with stirring for 5 hours. To the resulting crude product is added 20 grams of water, the mixture is extracted with hexane and an additional 200 grams of water is added. The product is an aqueous solution of 1.16 milliequivalents of vinylbenzyltetramethylisothiouronium chloride per gram of solution.

Preparation of the Latex

The following ingredients are placed in a reactor:
2 parts of 2,2'-azobisisobutyronitrile;
4 parts of Surfactant Solution A;
additional water to a total of 300 parts;
40 parts of methyl methacrylate;
60 parts of ethyl acrylate.

The reactor is purged with nitrogen and the reactor contents are heated at 70° C with stirring. After 40 minutes, the comonomeric emulsifier Solution B, which had previously been diluted to a 5 percent-active solution, is added at the rate of 10 parts per hour for 4.5 hours. The reaction conditions of 70° C and stirring are continued for a total reaction time of 15 hours. After filtration, there is recovered a very fluid, stable latex having a solids content of 23.9 percent and a particle size of 865 Angstroms and containing 0.17 milliequivalent of isothiouronium group per gram of polymer.

Electrodeposition of the Latex

To a portion of the above-described latex is added sufficient diammonium hydrogen phosphate to adjust the conductivity to 1500 micromhos per centimeter, the pH is adjusted to 7.7 and the resulting formulation is diluted to 10 percent solids.

The above-described formulation is used to coat zinc phosphated steel panels by cathodic electrodeposition. For each series a rectangular polyethylene electrodeposition cell containing two graphite anodes of equal size located at the ends of the long axis is partially filled with the latex. A rectangular sample, about 2¾ inches by 5⅞ inches by 1/16 inch, of the indicated metal is immersed in the latex to a depth sufficient to provide 10,000 square millimeters of metal surface in contact with the latex halfway between the two anodes with the flat 2¾ inch by 5⅞ inch plane normal to a straight line between the two anodes. A source of direct current at 150 volts is connected individually to the two anodes and to each of the samples which function as the cathode. After 30 seconds, the potential source is disconnected.

Data reported for the electrodeposition is the average of the results for two panels unless otherwise indicated.

The coated panels are removed from the bath and rinsed with deionized water. The uniform coating remains firmly adhered during the rinse. After drying, the coating weight is 1.9 milligrams per square centimeter. During the process, there is rapid current cut off.

EXAMPLE 3

Preparation of a Latex

The following ingredients are placed in a reactor:
1 part of dodecylbenzyldimethylsulfonium chloride,
2 parts of 2,2'-azobisisobutyronitrile;
0.4 part of dodecanethiol;
0.2 part of 2,6-di-tert-butyl-4-methylphenol;
9.2 parts of Comonomeric Emulsifier Solution B from Example 2 (3 parts active);
Sufficient additional water for a total of 300 parts;
64.5 parts of styrene;
82.5 parts of butadiene.

The reactor is purged with nitrogen and the reactor contents are heated at 85° C for 16 hours with stirring. The resulting product having a solids content of 29.2 percent is vacuum stripped and there is obtained a fluid latex having a solids content of 31.9 percent and a particle size of 1,140 Angstroms.

Electrodeposition of the Latex

To a portion of that latex is added 0.1 milliequivalent of Surfactant Solution A per gram of solids, the latex is diluted to 10 percent solids, the conductivity is adjusted to 1500 with diammonium hydrogen phosphate, and the pH is adjusted to 7.6 with ammonium hydroxide. The resulting formulation is electrodeposited on zinc phosphated steel panels as described in Example 2 except that the electrical potential is 200 volts maintained for 2 minutes, rather than 150 volts for 30 seconds. During the process, the bath stability is good and there is very rapid current cut off. The very hydrophobic coating which is thus applied to the panel adheres very firmly during the water rinse. After drying, the coating is found to be 0.2 mil thick and the coating weight is 0.56 milligram per square centimeter.

EXAMPLE 4

An aqueous dispersion is prepared from 30 grams of a polybutadiene resin having a molecular weight of 3300 and 4 grams of an aqueous solution containing 0.73 milliequivalent of dodecylbenzyltetramethylisothiouronium chloride per gram of solution by slowly adding 66 grams of water with stirring, during which the system inverts to give a smooth, fluid emulsion containing 30 percent of the resin having a particle size of about 10,000 Angstroms.

The aqueous dispersion of polybutadiene resin is formulated for use in electrodeposition by adding sufficient dodecylbenzyltetramethylisothiouronium chloride to bring the total to 0.2 milliequivalent per gram of resin, diluting the dispersion with water to 300 grams, raising the conductivity to 850 with diammonium hydrogen phosphate and adjusting the pH to 8.4 with ammonium hydroxide.

The formulated latex is mixed with 20 grams of an aqueous dispersion containing 50 percent of pigment of which 99 percent is titanium dioxide and 1 percent is carbon black (Raven 1500) and 0.1 milliequivalent of dodecylbenzyldimethylsulfonium chloride per gram of pigment; then the mixture is diluted with water to 360 grams.

The resulting mixture is electrodeposited on zinc phosphated steel panels by the procedure described in Example 2 except the electric potential is 100 volts. There is rapid current cut off in the process. A very hydrophobic coating is obtained. After rinsing the coated panel with water and baking at 175° C for 20 minutes, the coating thickness is 1.3 mils and the coating weight is 4.6 milligrams per square centimeter.

That which is claimed is:

1. A latex of a water-insoluble organic polymer which is electrically non-conductive when in a dry state having particles which are stabilized in aqueous dispersion by cationic groups of which a substantial portion are isothiouronium groups having nitrogen atoms with covalent bonds only to carbon atoms; said latex having a pH in the range of from about 2 to about 12 and having a particle size of from about 500 Angstroms to about 10,000 Angstroms.

2. The latex of claim 1 in which the total amount of cationic groups is from about 0.02 milliequivalent to about 0.4 milliequivalent per gram of polymer.

3. The latex of claim 1 which has a pH of from about 6 to about 10.

4. The latex of claim 1 in which some of the cationic groups are provided by sulfonium cations.

5. The latex of claim 1 in which the isothiouronium group has the formula

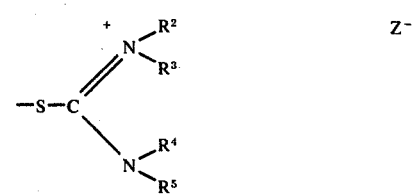

wherein $R^2$ and $R^5$ individually are alkyl or hydroxyalkyl having from 1 to 4 carbon atoms, $R^3$ and $R^4$ individually are alkyl or hydroxyalkyl having from 1 to 4 carbon atoms or are combined in one divalent radical having from 2 to 3 carbon atoms and $Z^-$ is a water-soluble anion.

6. The latex of claim 1 in which the isothiouronium group is provided by an adsorbed isothiouronium surfactant.

7. The latex of claim 6 in which the isothiouronium surfactant is dodecylbenzyltetramethylisothiouronium chloride.

8. The latex of claim 1 in which the isothiouronium groups are provided by a copolymerized monomer having an isothiouronium group of the formula

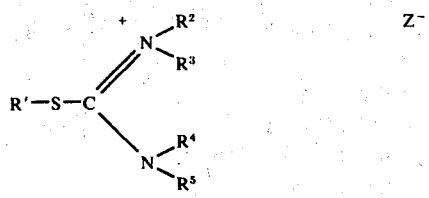

wherein R' is a monovalent organic radical having polymerizable ethylenic unsaturation, $R^2$ and $R^5$ individually are alkyl or hydroxyalkyl having from 1 to 4 carbon atoms, $R^3$ and $R^4$ individually are alkyl or hydroxyalkyl having from 1 to 4 carbon atoms or are combined in one divalent radical having from 2 to 3 carbon atoms and $Z^-$ is a water-soluble anion.

9. The latex of claim 8 in which the isothiouronium monomer is copolymerized with one or more neutral electrically non-conductive, emulsion polymerizable, ethylenically unsaturated monomers.

10. The latex of claim 8 in which the monomer having an isothiouronium groups is vinylbenzyltetramethylisothiouronium chloride.

11. The latex of claim 1 in which the isothiouronium compound has the formula

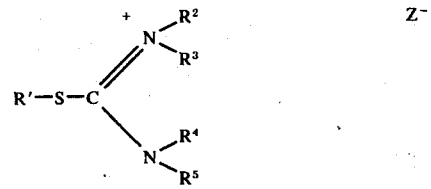

wherein R' is a long chain, monovalent hydrophobic radical having from 8 to 25 carbon atoms, $R^2$ and $R^5$ individually are alkyl or hydroxyalkyl having from 1 to 4 carbon atoms, $R^3$ and $R^4$ individually are alkyl or hydroxyalkyl having from 1 to 4 carbon atoms or are combined in one divalent radical having from 2 to 3 carbon atoms and $Z^-$ is a water-soluble anion.

* * * * *